Figure 3:
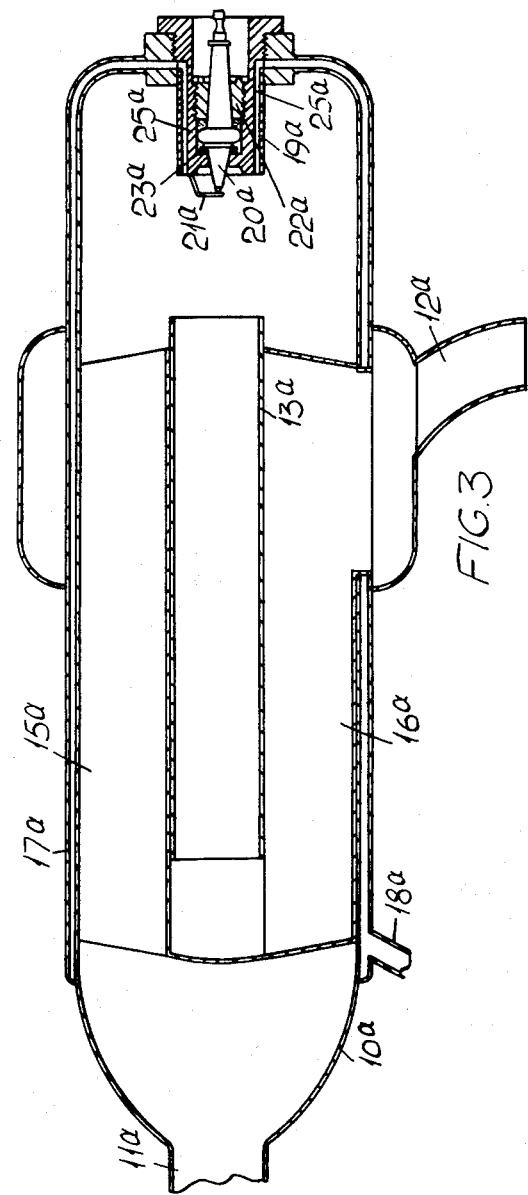

Aug. 3, 1965   J. S. CLARKE ETAL   3,197,956
INTERNAL COMBUSTION ENGINE EXHAUST AFTERBURNER
Filed June 6, 1963   2 Sheets-Sheet 1
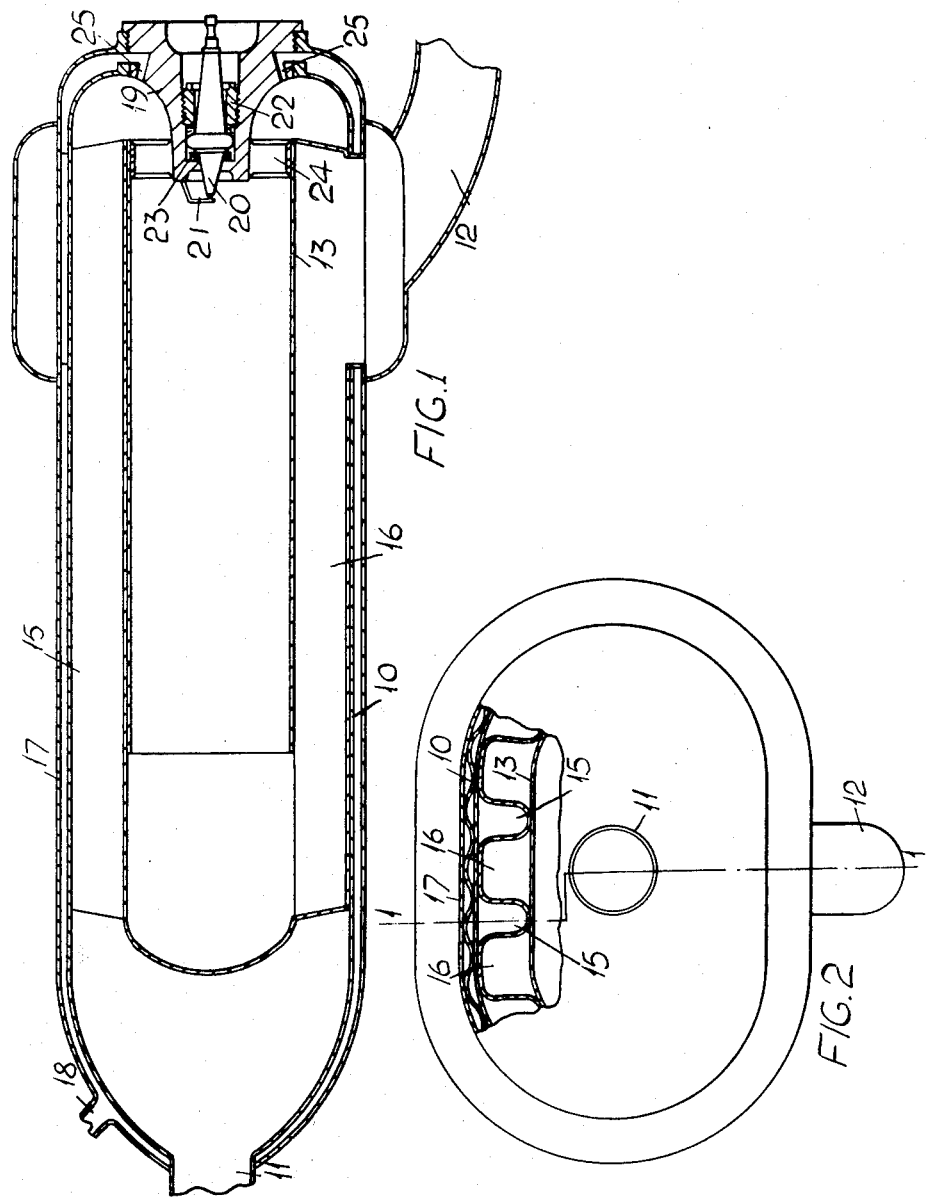

Aug. 3, 1965     J. S. CLARKE ETAL     3,197,956
INTERNAL COMBUSTION ENGINE EXHAUST AFTERBURNER
Filed June 6, 1963     2 Sheets-Sheet 2

3,197,956
INTERNAL COMBUSTION ENGINE EXHAUST
AFTERBURNER
John Stanley Clarke, Edgbaston, Birmingham, and John Peter Soltau, Dorridge, Solihull, England, assignors to Joseph Lucas (Industries) Limited, Birmingham, England
Filed June 6, 1963, Ser. No. 285,944
2 Claims. (Cl. 60—30)

This invention relates to combustion apparatus of the kind intended to form part of the exhaust system of an internal combustion engine and comprising a combustion chamber, means for directing the exhaust gases to the combustion chamber, means for mixing combustion air with the exhaust gases as they enter the combustion chamber, and an electrically operable ignition plug (i.e. spark plug or glow plug) for initiating combustion.

The object of the invention is to provide such apparatus in a convenient form.

According to the invention in combustion apparatus of the kind specified at one end of the combustion chamber is a body part around which the exhaust gases are caused to flow on their way to the combustion chamber, said body part having a central bore adapted for the reception of igniter means, and having formed therein air inlet passages for directing air into the stream of exhaust gases.

In the accompanying drawings FIGURE 1 is a sectional side view, and FIGURE 2 is a part sectional end view of an example of the invention, the section for FIGURE 1 being taken on the line 1—1 of FIGURE 2, and FIGURE 3 is a sectional side view of a modified construction.

Referring first to FIGURES 1 and 2 of the drawings, there is provided an elongated casing 10 having at its upstream end an exhaust gas inlet 11, and an outlet 12 near its downstream end. Within the casing is supported in spaced relationship an elongated combustion chamber 13, whilst the space between the chamber 13 and casing 10 is divided into two series of alternating passages by means of a corrugated sheet having its inwardly and outwardly directed crests in contact with the chamber and casing respectively. The series of passages 15 serves to establish communication between the exhaust gas inlet 11 and the downstream end of the combustion chamber, whilst the series of passages 16 establishes communication between the upstream end of the combustion chamber and the outlet 12. The passages thus serve as a heat exchanger whereby the exhaust gases flowing downstream to the combustion chamber will be preheated by the gases flowing from the combustion chamber to outlet, the gases in the combustion chamber being directed in an upstream direction relative to the apparatus as a whole.

Surrounding the casing is an air jacket 17 having an air inlet 18 at its upstream end.

At the downstream end of the apparatus is a separately formed and axially disposed body part 19 in which is formed an axial bore adapted to receive an igniter plug 20 or a spark plug. The body part may be screw-threaded to engage a complementary screw-thread in the apparatus and carries at its inner (i.e. upstream) end an electrode 21 for association with an electrode at the inner end of the plug 20 extending from the bore, the plug 20 being electrically insulated from the body 19 by means of an externally screw-threaded bush 22 engaging a screw-thread in the bore, and serving to hold complementary annular shoulders on the plug and body part in sealing contact with opposite sides of an electrically insulating washer 23.

The inner end of the body part 19 is surrounded by an annular swirler 24 which fits within a central circular inlet at the downstream end of the combustion chamber 13, and the exhaust gases from the series of passages 15 is caused to flow around the inner portion of the body part before passing through the swirler into the combustion chamber. Moreover, in the body part are formed a plurality of angularly spaced air inlet passages 25 which communicate with the annular space between the air jacket 17 and casing 10. The air inlet passages are arranged to direct air from the air inlet 18 into the exhaust gases flowing around the body part prior to their passing through the swirler 24, and the resulting combustible mixture issuing from the swirler is caused to flow around the electrodes of the spark plug.

In the construction shown in FIGURE 3 wherein parts similar to those in FIGURES 1 and 2 are given the same reference numeral with the suffix a, the inner end of the body part 19a, is spaced a short distance in a downstream direction from the inlet of the combustion chamber 13a, the inlet being of a diameter substantially equal to the diameter of the adjacent end of the body part. In this construction the angularly spaced air inlet passages 25a in the body part extend parallel to the axis of the latter, and end at the inner end thereof. As a result the air emitted from the air inlet passages is caused to mix with exhaust gases as they flow inwardly from around the body part to pass through the hole in the baffle. Thus the mixing is effected in proximity to the electrodes of the spark plug.

Having thus described our invention what we claim as new and desire to secure by Letters Patent is:

1. Combustion apparatus for treating exhaust gases comprising a casing having an upstream end, an exhaust gas inlet connected to said casing to introduce exhaust gases into said upstream end in a direction generally parallel to the length of said casing, an elongated combustion chamber closed at its end adjacent said exhaust gas inlet positioned generally axially of said casing, ignition means mounted in said casing coaxially of said combustion chamber at the downstream end of said casing remote from said exhaust gas inlet, means between said combustion chamber and said casing supporting said combustion chamber and providing alternate two sets of passages extending parallel to the axis of said casing, one set of passages conducting exhaust gases from said exhaust gas inlet to the end of said casing remote from said exhaust gas inlet and adjacent said ignition means, the other set of passages conducting gases from adjacent the closed end of said combustion chamber in a downstream direction, an outlet at the downstream end of said second set of passages, and a plurality of air supply passage means to supply air to said combustion chamber, said air supply passage means entering said casing adjacent said ignition means arranged to direct air toward said combustion chamber.

2. The combustion apparatus of claim 1 in which swirler means is provided in the end of the combustion chamber adjacent said ignition means.

References Cited by the Examiner
UNITED STATES PATENTS

| 1,848,990 | 3/32 | Boyd et al. | 60—30 X |
| 2,065,681 | 12/36 | Fogas | 60—30 X |
| 2,829,731 | 4/58 | Clayton | 60—30 X |

JULIUS E. WEST, Primary Examiner.